Patented Sept. 2, 1930

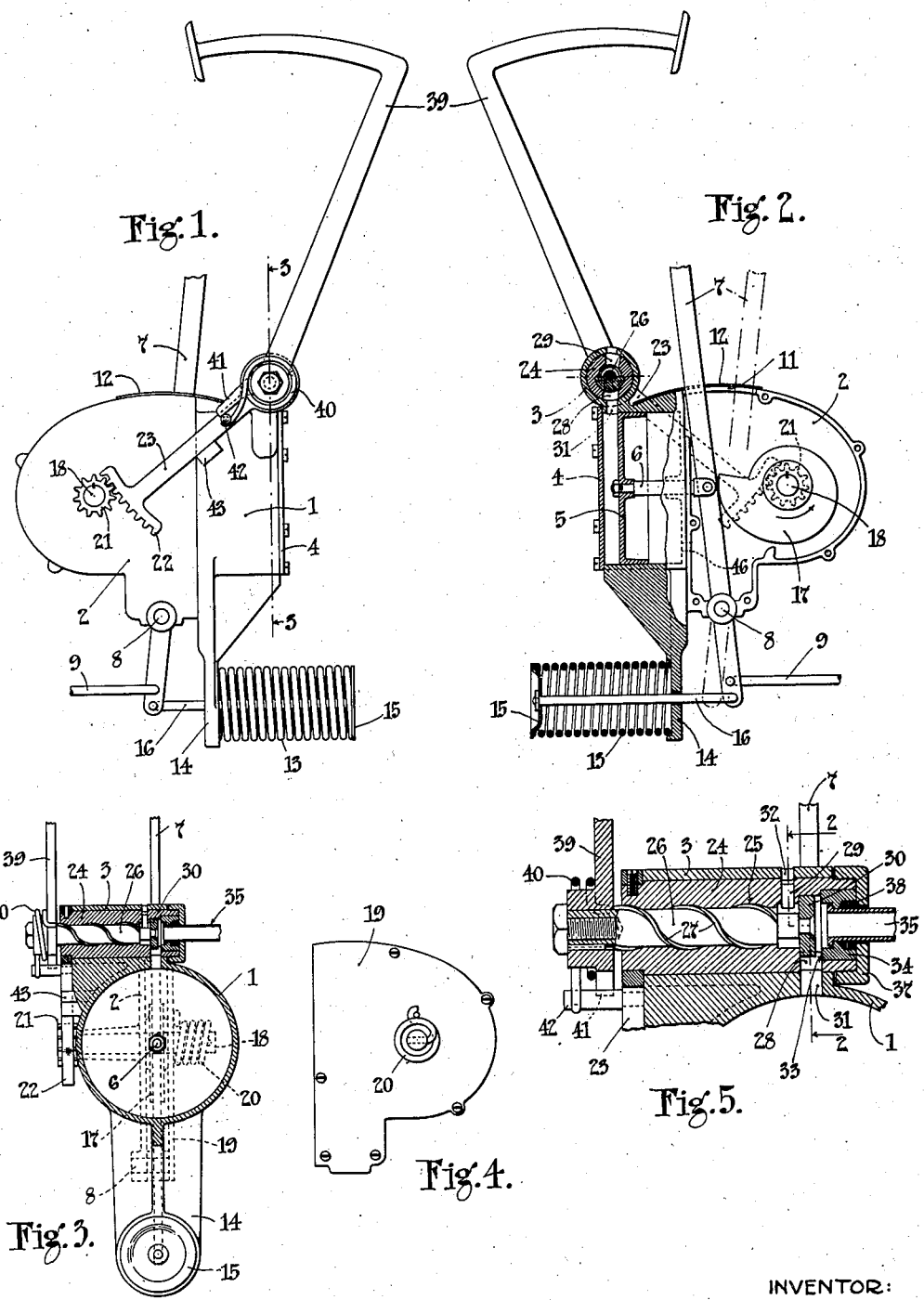

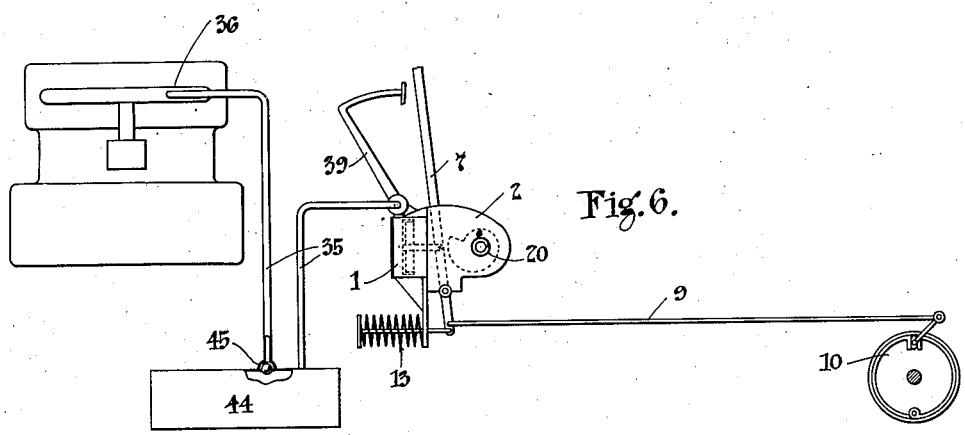
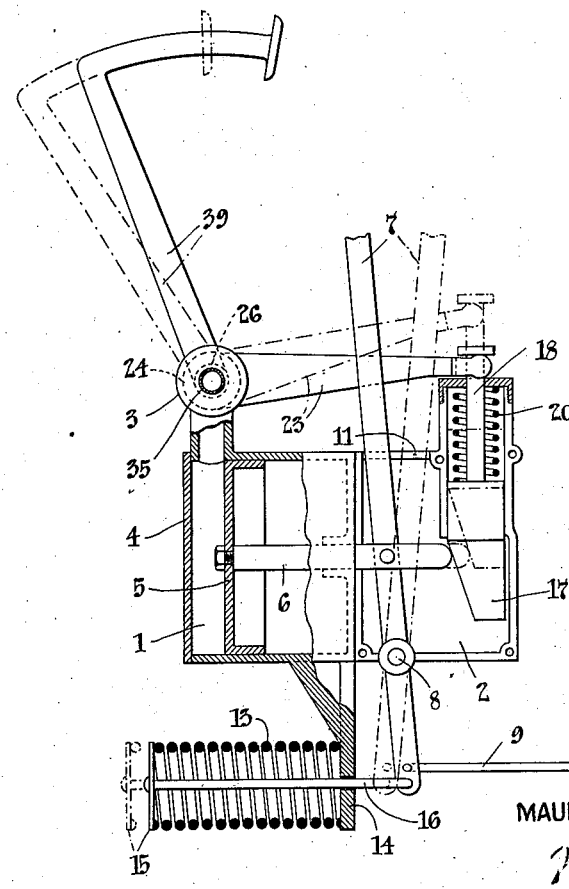

1,774,796

UNITED STATES PATENT OFFICE

MAUNSELL BOWERS JACKSON, OF TORONTO, ONTARIO, CANADA

BRAKE-OPERATING MECHANISM

Application filed April 17, 1929. Serial No. 355,868.

This invention relates to brake operating mechanism and has for its object to provide improved mechanism of this kind.

According to one form of the present invention the mechanism includes spring means which constantly tend to apply the brakes, and suction operated means which prevent actuation of the brakes so long as the suction operated means are connected to a source of sub-atmospheric pressure, such as the induction pipe of an internal combustion engine. Means are also provided for positively controlling the actuation of the brakes and the suction operated means, so that the brakes can be actuated to any desired extent. The invention provides a mechanism whereby the brakes of an automobile can be applied to any desired degree without undue muscular effort and wherein, should the source of suction fail, the application of the brakes can still be effected as usual and can also be released by manually applied force.

The invention consists in the construction, combination and arrangement of parts hereinafter described and more particularly pointed out in the appended claims.

Referring now to the accompanying drawings, which illustrate, by way of example, convenient forms of the invention:

Figure 1 is a side elevation of the preferred form of the invention;

Figure 2 is an elevation of the other side of the device shown in Figure 1, partly in section on the line 2—2 of Figure 5, and with certain parts omitted;

Figure 3 is a transverse section on line 3—3 of Figure 1;

Figure 4 is a side elevation of the parts omitted from Figure 2;

Figure 5 is a portion of Figure 3 drawn on an enlarged scale;

Figure 6 is a diagrammatic side elevation showing the connection of the improved device to an engine and brake, and Figure 7 is a longitudinal vertical section of a modified form of the invention.

As shown in Figures 1 to 6, the invention comprises a horizontal cylinder 1, a rearwardly projecting casing 2 and a transverse cylindrical portion 3, all of which may conveniently be made integral with one another. The forward end of the main cylinder 1 is closed in an air-tight manner by a plate 4. Slidably mounted in the cylinder 1 is a piston 5 having a piston rod 6 slidably mounted in the rear end wall of the cylinder, and pivotally connected at its rear end to a lever 7 which is pivoted at 8 in the casing 2.

The lower end of lever 7 is connected by a rod 9 to a brake which is indicated at 10 in Figure 6, and the lever 7 projects upwardly through a slot 11 in the top of casing 2, a curved plate 12 being preferably provided which engages the top surface of casing 2 and moves with lever 7, thus covering the slot 10 and preventing the passage of dirt through the slot regardless of the position of lever 7. Means constantly tending to apply the brakes are provided. These means as illustrated comprise a spring 13 which is compressed between a bracket 14 depending from the cylinder casting 1, and a disc 15 which is connected by a rod 16 to the lower end of lever 7.

Spring 13 constantly tends to apply the brake 10 and to swing the lever 7 to the position shown in chain-dotted lines in Figure 2. Means are provided to prevent the spring 13 from swinging the lever 7 except when the brake is to be applied, and then to control the movement of lever 7 in accordance with the degree of braking action required. These means include a suitably shaped cam, such as 17 keyed on a shaft 18 which is rotatably mounted in aligned horizontal bearings in the side wall and cover plate 19 of the casing 2. A spring 20, coiled on one end of shaft 18, constantly urges cam 17 in the direction of the arrow shown in Figure 2.

On the other end of shaft 18 is keyed a pinion 21 which meshes with an arcuate rack 22 carried by an arm 23. The upper end of arm 23 is secured to a sleeve 24 rotatably mounted in the transverse cylinder 3. The sleeve 24 has an axial bore formed with an internal screw thread 25 which is preferably a multiple thread of long pitch.

A stem 26 is mounted in the bore of sleeve 24 and is formed with a thread 27 to engage the thread 25 in the sleeve.

The sleeve 24 is formed with ports 28 and 29, and a valve 30 on stem 26 normally prevents communication between these ports. The port 28 always registers with a port 31 leading to the cylinder 1, and the port 29 constantly registers with a port 32 communicating with the atmosphere. The valve 30 is normally spaced from a seat 33 on an annular member 34 in which is anchored one end of a pipe 35 which communicates with the induction manifold of an internal combustion engine, indicated at 36 in Figure 6. A cap 37 secures the member 34 to the sleeve 24 and compresses packing 38 about the pipe 35, and also restrains the sleeve against axial movement while permitting rotation thereof.

Rigidly mounted on the outer end of valve stem 26 is a foot operated pedal 39. A spring 40 engages the pedal 39 and the arm 23 and normally maintains an extension 41 on pedal 39, against a stop 42 on the lever 23, the latter being normally held against a stop 43, on the cylinder 1, by means of spring 20.

A vent such as 46 is provided in the rear wall of the cylinder 1.

A vacuum tank or receiver 44 is preferably interposed in the suction pipe 35 and a suitable non-return valve, indicated at 45, may be provided to prevent leakage of air into the tank when the engine is not running.

The operation is as follows: The spring 13 constantly tends to apply the brake but is normally prevented from doing so by the cam 17 and by reduction of pressure in the cylinder 1. When the brake is to be applied, pressure is applied to the pedal 39 which causes rotation of the valve stem 26. During the initial movement of the pedal 39 the sleeve 24 remains stationary as spring 40 is much weaker than spring 20. The extension 41 therefore moves away from stop 42 and the thread 27 causes the stem 26 and valve 30 to move axially to the right as viewed in Figures 3 and 5. This axial movement continues until the valve 30 engages its seat 33. When the valve reaches this position, the suction pipe 35 is cut off from the cylinder 1 and the latter is then in communication with the atmosphere through ports 29 and 32. As atmospheric pressure now acts on both sides of piston 5, the spring 13 presses the lever 7 into engagement with the cam 17, but the contour of the cam and the relative strengths of springs 13 and 20 are such that spring 13 cannot by itself cause rotation of the cam 17 against the action of spring 20 although it has a tendency to do so.

When the valve 30 has become seated further axial movement of stem 26 is impossible and the sleeve 24 is compelled to rotate with the stem 26. The rotation of the sleeve 24 causes arm 23 to be lifted from stop 43 and the consequent movement of rack 22 causes rotation of pinion 21 against the action of spring 20. The cam 17 rotates with the pinion 21 in a clockwise direction as seen in Figure 2, and, since there is now atmospheric pressure on both sides of piston 5, the spring 13 expands and swings the lever 7 and thereby applies the brakes to a degree depending upon the amount of movement imparted to the pedal 39. So long as the cam 17 rotates in a clockwise direction the lever 7 will remain in contact with the periphery of the cam, and if the pedal 39 is pressed to the limit of its movement, the narrowest part of the cam will be engaged by the lever 7 and the spring 13 will apply the brake fully. If the movement of pedal 39 is arrested at any point between the limits of its movement, the movement of the cam will be arrested also and the brake will be only partially applied to a degree proportional to the movement imparted to the pedal 39.

If the operator's foot is removed from the pedal 39, the spring 40 rotates it relatively to arm 23 until the extension 41 engages stop 42, and this relative rotation causes axial movement of the stem 26 to the left, as seen in Figures 3 and 5. This axial movement disengages the valve 30 from its seat 33 to connect the cylinder 1 with the suction pipe 35 and disconnects the cylinder 1 from the atmospheric relief ports 29 and 32. The reduction of pressure in cylinder 1 causes the piston 5 to pull the lever 7 away from the cam 17 and the same movement compresses spring 13 and takes off the brakes. The retraction of lever 7 from the cam enables the spring 20 to return the cam to its normal position. If the pedal 39 is arrested before it has returned fully to its normal position, the spring 20 will continue to move the arm 23 until it engages the extension 41. This movement of arm 23 relative to pedal 39, rotates journal 24 relatively to the stem 26 and returns the valve 30 to its seat 33, thus opening the cylinder to the atmosphere and permitting the spring 13 to pull the lever 7 into engagement with the cam.

It will thus be seen that the brake will always be applied to the desired degree, that is to a degree proportional to the movement of the pedal 39.

When there is atmospheric pressure in the cylinder 1, the spring 13 gives the lever 7 a tendency to rotate the cam 17 against the spring 20, and the strength of the spring 13 and the contour of the cam are such that very little foot pressure is required on the pedal 39 to rotate the cam when the lever 7 is being pressed against it by the spring 13.

Accidental failure of the suction, due to stalling of the engine or otherwise, does not cause automatic application of the brakes, but in case of such a failure the brakes can be applied by means of the pedal as above described and may be taken off by manually rocking lever 7 back to its normal position.

A modified form of the invention is shown in Figure 7 in which similar numerals indicate parts which are equivalent to those described above. Instead of a cam rotated by a rack and pinion, an inclined member 17 carried by a vertically slidable rod 18 is arranged to be reciprocated vertically by the forked end of the arm 23. The spring 20 constantly urges the inclined member 17 towards its lowermost, or normal, position. The construction and operation of this form of the invention is otherwise the same as in the form previously described.

The foregoing description and accompanying drawings are given by way of illustration only and many modifications may be made without departing from the scope of the invention as defined in the following claims.

I claim:

1. Brake operating mechanism comprising brake applying means, fluid pressure operated means for rendering said brake applying means normally ineffective, mechanical means for positively rendering said brake applying means ineffective, and manually operated means for actuating said mechanical means to permit the brake applying means to become effective to any desired degree.

2. Brake operating mechanism comprising a brake applying spring, fluid pressure operated means for rendering said spring normally ineffective, mechanical means for positively preventing said spring from normally becoming effective, valvular means for controlling said fluid operated means, and manually operated means for actuating said valvular means and said mechanical means to cause said spring to become effective to a degree proportionate to the degree of actuation of said manually operated means.

3. Brake operating mechanism comprising brake applying spring-means, fluid pressure operated brake releasing means and manually operated means for positively controlling said brake applying and brake releasing means in accordance with the movement of said control means.

4. Brake operating mechanism comprising brake applying spring means, fluid pressure operated brake releasing means, a lever connected to said brake applying means and said brake releasing means on opposite sides of its fulcrum, mechanical means normally preventing movement of said lever, valve means for controlling said fluid pressure operated means, and manually operable means for controlling said valve means and for moving said mechanical means to permit movement of said lever in proportion to the movement of said manually operable means.

5. Brake operating mechanism comprising a brake applying spring, a chamber, a movable member in said chamber, a lever connected to said movable member and said brake applying spring, a cam cooperating with said lever, a spring arranged to act on said cam in opposition to the brake applying spring, valve means to connect said chamber with either atmospheric or sub-atmospheric pressure, and means for controlling said valve means and the movement of said cam.

6. Brake operating means comprising a brake applying spring, a chamber, a movable member in said chamber, a lever connected to said movable member and said brake applying spring, a cam cooperating with said lever, valve means to connect said chamber with subatmospheric pressure to cause compression of said brake applying spring or with atmospheric pressure to permit expansion of said brake applying spring, means to control said valve means and the movement of said cam so that the movement of the lever is proportional to the movement of said control means.

7. Brake operating means as claimed in claim 6, wherein valve means comprises a screw-threaded stem, a valve on said stem, a sleeve in which said stem is mounted, and wherein said control means comprises a pedal connected to said stem, an arm connected to said sleeve, and a driving connection between said arm and the cam.

8. Brake operating means as claimed in claim 6, wherein valve means comprises a screw-threaded stem, a valve on said stem, a sleeve in which said stem is mounted, and wherein said control means comprises a pedal connected to said stem, an arm connected to said sleeve, and a driving connection between said arm and the cam, a spring being provided tending to maintain said cam and said arm in normal position and a further spring tending to maintain said pedal in normal position with respect to said arm.

9. Brake operating means comprising brake applying means, fluid pressure operated brake releasing means normally counteracting said brake applying means, manually operated means controlling said fluid pressure operated means, and means for positively controlling the operation of said brake applying means in accordance with the operation of said manually operated means.

In testimony whereof I have affixed my signature.

MAUNSELL B. JACKSON.